United States Patent
Becker

[11] 3,944,172
[45] Mar. 16, 1976

[54] ATTITUDE CONTROL FOR SPACE VEHICLE

[75] Inventor: Klaus Becker, Bremen, Germany

[73] Assignee: ERNO Raumfahrttechnik GmbH, Bremen, Germany

[22] Filed: Feb. 3, 1975

[21] Appl. No.: 546,541

Related U.S. Application Data

[63] Continuation-in-part of Ser. No. 350,916, April 13, 1973, abandoned.

[30] Foreign Application Priority Data
Apr. 14, 1972 Germany.......................... 2217949

[52] U.S. Cl. ............. 244/169; 235/150.2; 244/3.22
[51] Int. Cl.² ................................................. B64G 1/00
[58] Field of Search ....... 235/150.2; 244/3.15, 3.22, 244/169; 73/178 R

[56] References Cited
UNITED STATES PATENTS
| | | | |
|---|---|---|---|
| 2,974,594 | 3/1961 | Boehm............................ | 244/169 X |
| 3,437,288 | 4/1969 | Lam.................................. | 244/3.15 |
| 3,643,897 | 2/1972 | Johnson, Jr........................ | 244/169 |

Primary Examiner—Trygve M. Blix
Assistant Examiner—Stephen G. Kunin
Attorney, Agent, or Firm—Ralf H. Siegemund

[57] ABSTRACT

Method of providing position, e.g. attitude control for space vehicles having control thrusters producing thrust for imparting momentum upon the vehicle, further having a control apparatus for the thrusters causing them to produce thrust bursts or pulses so that controlled, incremental momenta be imparted upon the vehicle, such thrust bursts being triggered respectively when the vehicle tends to move beyond selected descrete deviations and error position levels. The highest level, one in either direction, define a range of positional tolerance, and the thrusters are operated, so that a relatively small momentum is produced when the vehicle tends to move past either of said maximum levels; the thrusters are operated on the other levels under these conditions. The momentum produced on any such level is smaller than the sum of momenta to be produced on all higher position levels; such corrective momentum is produced only after momenta have been produced for all selected smaller position levels; and each level (except the highest) is used only for each sequence of thrust bursts leading to a residual error cycle wherein the vehicle is caused to oscillate within the range of tolerance with reversal occuring on each range limit.

5 Claims, 7 Drawing Figures

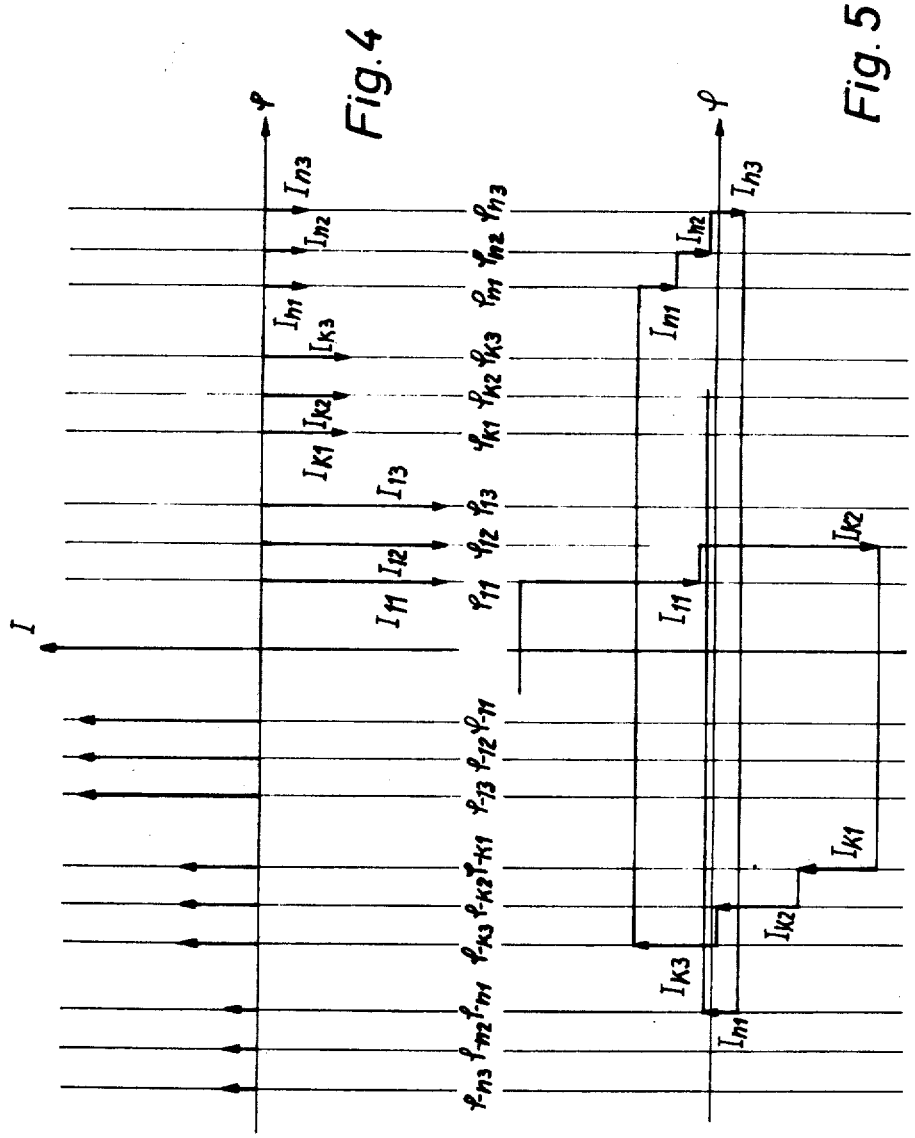

ATTITUDE CONTROL FOR SPACE VEHICLE

BACKGROUND OF THE INVENTION

This application is a continuation-in-part application of application Ser. No. 350,916 filed Apr. 13, 1973, now abandoned.

The present invention relates to control of space vehicles, particularly as to position, orientation and attitude control, using control propulsion units (thruster) which receive actuation commands for changing momentum of the vehicle, such as angular momentum, on a given axis, and under automatic feedback control conditions.

The attitude control of space vehicle is carried out by means of propulsion units (thrusters) to impart upon the vehicle well defined angular momentum for each instance of actuation, so as to turn the vehicle if its actual attitude deviates from the desired attitude. The vehicle will turn if thrust pulses are produced and act on the vehicle at points exerting a lever effect in relation to its center of gravity. These thrust pulses tend to counteract incorrect angular orientation of the vehicle, and, of course, any undesired rotation is to be suppressed. The thrust bursts are triggered if the incorrect angular orientation and attitude, defined as solid angles, exceeds particular differences (error) between desired and actual attitude in relation to any of the pitch, roll and yaw axes. Basically, the known systems operate in that the momentum produced with any thrust burst and in relation to any such axis increases with increasing error angle of attitude as to that axis.

In case the space vehicle turns on a particular axis and with a particular rotational or angular velocity, a control thrust of well defined amplitude and duration issues after a first attitude error level, i.e., a particular angle between desired and actual attitude, has been exceeded. If the angular velocity is relatively large, the corrective angular momentum produced by the control thrust will not be sufficient to stop the roatation, it will merely slow the rotation. Therefor, additional i.e. higher, levels of attitude errors will be traversed and additional control bursts of larger amplitude are produced in the same direction as the first one. The production of such control thrust bursts of increasing magnitude continues until rotation in direction away from the desired attitude stops. If the last thrust pulse or burst so produced is larger than needed to stop the rotation, angular momentum in the opposite direction is imparted upon the vehicle; normally this will be the case, causing the vehicle to rotate back to its desired attitude. There will be some overshoot, and the desired attitude will be reached only after several control thrust burst in different directions.

The operation as described could be termed a directly staggered thrust mode using angular momentum producing thrust bursts of different magnitude, such magnitudes depending upon and increasing with the angular ranges traversed due to undesired deviations in attitude. The individual incremental angular momentum produced on an attitude error level at angle $\phi_k$ '$_k$ can be described by the equation:

$$(1)\ I_k = C \sum_{i=1}^{K-1} I_i\ ;\ 0 < C < 1$$

wherein $C$ is an implementation parameter between zero and unity, and $I$ stands for an incremental angular momentum resulting from a corrective thrust burst when attitude error traverses the $i$-level, angle $\phi_i$ with $\phi_i$ being $\phi_1$ or $\phi_2$ or ... or $\phi_n$, and $\phi_n$ being the maximum permissible attitude error angle and level in relation to the axis considered.

As these pulses are generated for either direction of attitude deviation from desired attitude and orientation, the attitude of the vehicle will converge towards an orientation within the lowest level range ($\phi_1/\phi_{-1}$) with reference to that axis. The vehicle will oscillate about a position that is centered between $\pm\phi_1$ for sequential reversals of rotation. In other words, the stability of the vehicle is dynamically maintained whereby the rotation is reversed by the lowest level thrust burst whenever the vehicle reaches $\phi_1$ or $\phi_{-1}$. This mode will be termed residual error mode, and the oscillatory motion of the vehicle is carried out as an residual error cycle centered about the desired attitude.

It was found that this process of control has some inherent disadvantage with regard to frequency of producing such control thrust bursts and with corresponding regard to consumption of propellant needed for producing the thrust. This is particularly so if the vehicle has been intentionally taken out of a particular attitude and assumes (usually temporarily) a rather high velocity of rotation, for reasons of intentional attitude changes. The control system has to stabilize the attitude again on the new desired value. Returning the vehicle to the residual error mode and cycle requires considerable control effort with the known devices.

SUMMARY OF THE INVENTION

It is an object of the present invention to avoid the aforementioned drawbacks and to provide a control system for position control of a space vehicle, particularly attitude control, which operates with few control thrust bursts and at a low level of energy consumption for the production of the needed momentum.

In accordance with the preferred embodiment of the present invention, it is suggested to provide controlled thrust bursts for producing pulses or increments of momentum such as angular momentum, wherein the magnitude of each momentum is smaller than the sum total of all incremental angular momenta that are subsequently produced in the same direction, and that the instances of triggering thrust producing (attitude) control thrusters are selected so that each positioned (attitude) error level allocated for producing a control thrust, is used only once, except the two limit levels that define maximum permitted angular deflection of the vehicle from its desired attitude. Moreover, the position error (angle) levels as used for producing the thusly defined incremental momenta are run through in ascending order (absolute, independent from direction).

The mode of control in accordance with the invention can be termed as inversely staggered mode. An incremental angular momentum $I_K$ produced on the K'th level can be described as $$(2)\ I_K = C \sum_{i=K+1}^{n} I_i;\ 0 < C < 1$$

The factor $C$ must now actually be chosen to have each $I_K$ slightly smaller than the sum on the right-hand side of the equation.

The different levels are defined as descrete error angles $\phi$ ($\phi = 0$ is the desired attitude) with $\phi_1 < \phi_2 <$ ... $\phi_n$, and $\phi_n$ being the maximum permissible attitude error. The sequence of momentum producing thruster operation, as stated, is such that 1. any incremented angular momentum $I_K$ with $K < n$ is produced only once on traversal of error angle and level $\phi_K$ or $\phi_{-K}$ while the attitude error still increases; the respective thrust then produced, of course, tends to counteract further increase;

2. an incremental angular momentum $I_K$ is produced only after the momentum $I_{K-1}$ has been produced, in the same or in the opposite direction.

As a consequence, not more than $n$ control bursts are produced prior to the vehicle entering the final and continuing stabilizing, residual error cycle in which the vehicle turns back and forth.

The final, normal or stabilizing state is defined as slow, oscillatory rotation about the desired attitude with reversal when the limit is reached in each instance. That stabilized operation is to be reached in any instance (i.e., for any initial undesired rotation) after $n$ control bursts. This is possible generally under observance of the rule concerning dimensioning each angular momentum producing control thrust burst outlined above.

Additionally, the sum total of all angular momentum produced in the same direction must not be smaller than the maximum angular momentum that may occur and that is effective in producing attitude errors. This rule can be observed always just by chosing the number of levels sufficiently high, but it will be described below that a limited number of levels can be used if the momentum produced in the residual error cycle bears a particular relation to the maximum error producing momentum. Under these conditions, all such errors will be corrected, and, as stated, after $n$ control thrust bursts, the vehicle will, in fact, rotate back and forth between maximum error angles $\phi_n$ and $\phi_{-n}$ in the residual error mode. The vehicle continues in that residual error mode to undergo slow, oscillatory rotation about the desired attitude, using only low energy thrusts to effect reversal when the respective limit is reached.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 shows an improvement with incremental momentum staggering and grouping;

FIG. 5 shows how an undesired rotation of the vehicle is brought under control, using staggering and grouping as explained with reference to FIG. 4;

Turning now to FIG. 6, there is illustrated schematically conventional attitude control equipment for a space vehicle, showing two control nozzles 1 and 2 for producing control jets so as to impart thrust upon the vehicle. The jets are produced by controlling the flow of a jet producing fluid from a fuel tank 3. The jets are turned on and off in response to control signals from a control box 4, which responds to signals, from a sensor 5. The equipment 1, 2, 3, 5 is conventional. The same is true for control box 4 except that the specific timing and sequencing of control signals produced in response to attitude errors is carried out in accordance with the invention by conventional means. Particular reference is made here to R. S. Gayhood and W. N. Keller "Attitude Control System" using logically controlled pulses, which is a publication of a paper read during the ARG Guidance, Control and Navigation Conference, Stanford, Calif., Aug. 7–9, 1961. Reference is further made to U.S. Pat. No. 2,974,594, and others, showing per se the production of controlled thrusts for attitude control. The invention can be realized with this equipment and relates specifically to the timing of the production of control thrust bursts in response to error angles $\phi$. The diagram in FIG. 1 illustrates how the control systems of the prior art reduces error producing vehicle rotations in a convergence towards slow, oscillatory rotation between two maxima angles $\phi_1$ and $\phi_{-1}$.

The abszissa shows error angles $\phi$ of deviation from the desired attitude $\phi = 0$, with $\phi_1, \phi_2 ... \phi_n$ denoting certain levels of error angles in ascending order. $\phi_K$ is shown representatively as any one level, because $K$ is used as running index. The ordinate shows angular momentum.

The prior art control method uses thrusters which produce corrective, angular momentum $I_1$ in one or the opposite direction when the attitude of the vehicle deviates from the desired attitude by angle $\phi_1$, but oriented in the opposite direction. Should the vehicle continue to turn thereafter in the same direction (though at a lower rate), the error angle increases to $\phi_2$ or $\phi_{-2}$, as the case may be, and when these levels are traversed another thrust burst is produced, producing another incremental angular momentum $I_2$. Should the vehicle still continue to turn in the same direction, an incremental, corrective angular momentum $I_2$ larger than $I_3$, is produced on traversal of the error level defined by an angle $\phi_3$ or $\phi_{-3}$, relative to the desired attitude, etc. There is usually a maximum deflection and error angle $\phi_n$ which, when traversed, causes a rather large incremental momentum $I_n$ to be produced.

The specific prior art system illustrated has five levels $\phi_1$ to $\phi_5$ (i.e., $n = 5$) and the momentum producing thrust bursts are proportioned in that the desired incremental angular momenta $I_K$ resulting from such bursts are defined by equation (1), which is restated presently;

$$(1) \; I_K = C \sum_{i=1}^{K-1} I_i \;; \; 0 < C < 1$$

$I_1$ is a value chosen to establish a low velocity level oscillatory rotation of the vehicle on the axis under consideration, which can be the yaw axis, the pitch axis, or the roll axis or a combination thereof. That residual rotation occurs from $\phi_1$ to $\phi_{-1}$, whereupon the thrusters produce $I_1$ to reverse the rotation until $\phi_1$ is reached and the thrusters produce $I_1$ in the opposite direction to obtain reversal again, etc.

Figure 1:
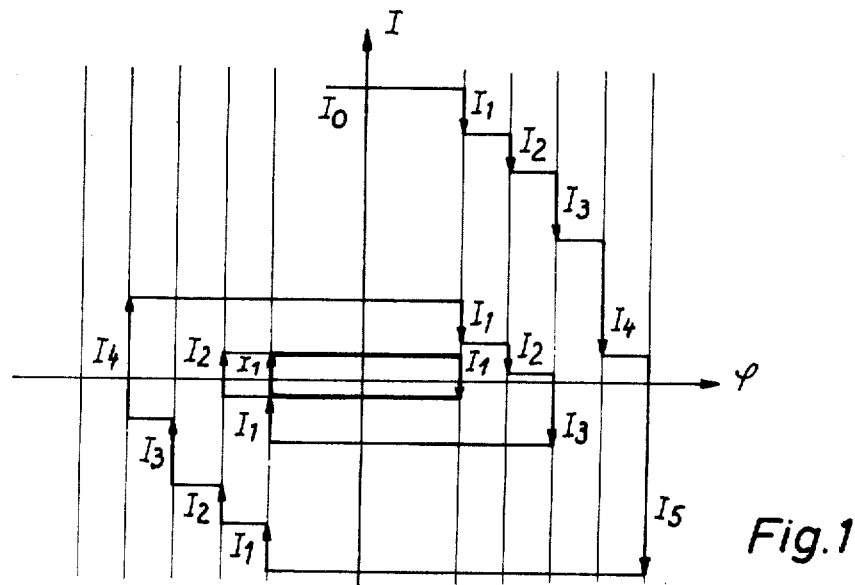
FIG. 1 shows how the known control system reduce an attitude error producing rotation of the vehicle until moving within a limit range of attitude errors and in a slow oscillating mode.

The FIG. 1 assumes that the vehicle has initially an angular momentum $I_0$ about a particular axis in relation to which offsetting control momentum is to be produced. $I_1, I_2, I_3, I_4$ and $I_5$ each is an angular momentum increment resulting from thrust bursts pulses whenever the respective level of angular misorientation ($\phi_K, K = 1, ... 5$) has been reached and is sensed.

FIG. 1 actually shows a complete regulating cycle and the several momentum vectors are concatenated so as to show how the vehicle is compelled to dynamically search for, home-in and maintain the desired attitude dynamically by operation of the $I_1 - _I$ residual error cycle tending to maintain the attitude of the vehicle within the range $\phi_1 - \phi_{-1}$ of residual error. This residual error cycle is shown in somewhat heavier lines.

The proportioning of the prior art control thrust bursts in accordance with equation (1), with increasing momentum for increasing error angle levels, leads to these results. The initial, undesired rotation due to a rather large angular momentum $I_0$ causes the vehicle to deviate rather rapidly from the desired attitude by the error angle $\phi_1$. As the vehicle rotation traverses that error angle level a slow down thrust burst reduces the initial momentum $I_0$ by $I_1$. $I_1$ having direction to function as an corrective, incremental angular momentum.

It is assumed in the present example that this corrective momentum is not sufficient to stop the rotation; a mere slow-down occurs, and soon the attitude error has increased to $\phi_2$, whereupon another thrust burst is triggered, producing an incremental, slow-down momentum $I_2$ etc., until upon reaching the large deflection angle $\phi_5$ a rather strongly corrective, incremental angular momentum $I_5$ is imparted upon the vehicle by a longer lasting thrust pulse, which causes the vehicle to reverse rotation. Soon the vehicle returns to desired attitude but overshoots, and when reaching angle $\phi_{-1}$, another slow-down operation commences etc., until, as stated, the vehicle rotation is brought under control so that upon traversing angle error level $\phi_1$ or $\phi_{-1}$, reversal of motion occurs in each instance. This is called the residual error cycle.

It can be seen that this known system will produce fifteen thrust bursts or pulses before the residual error cycle is entered. That entry can be defined by reversal of rotation on traversal of $\phi_1$ or $\phi_{-1}$.

This system works because any thrust pulse causing the vehicle to reverse is so strong so that the resulting momentum is equal to the sum of all available counteracting momenta causing again reversal prior to reaching the same level in the opposite direction [equation (1)]. As a consequence, the control will bring the vehicle into the residual error cycle. However, a large number of control thrusts is needed if the initial momentum was quite large.

Figure 2:
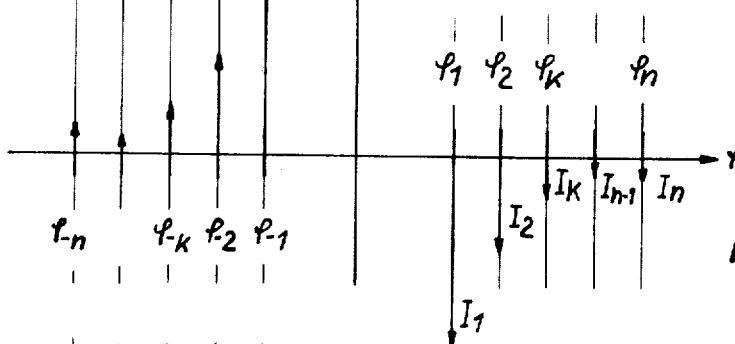
FIG. 2 is a diagram to explain the principle of inversely staggering the angular momentum producing control thrusts.

FIG. 2 shows how the control momenta are staggered in accordance with the preferred emnodiment of the present invention. Angle $\phi$ as plotted along the abszissa shows again deviation of the attitude of the vehicle from a particular angular orientation or a particular axis (roll, yaw or pitch or a combination thereof). $\phi = 0$ (or $\phi_0$) denotes the desired attitude and coincides with the ordinate in the graph. Again, error angles are shown in several descrete levels $\phi_1, \phi_2$, etc. in one direction and $\phi_{-1}, \phi_{-2}$, etc. in the opposite direction.

The ordinate in the graph of FIG. 2 shows the incremental control momentum as produced by thrust bursts, whenever the sensing system in the vehicle detects deviation angles larger than $\phi_1$ ($I_1$), or larger than $\phi_{-1}$ ($I_1$) in the opposite direction, or $\phi_2$ etc.

However, unlike the prior art, a thrust pulse in a particular direction and of particular duration as to the resulting corrective incremental angular momentum $I_K$ is not automatically produced on traversal of error level $\phi_K$. Rather, if a corrective momentum $I_K$ has been produced already, on error level $\phi_K$, no such momentum will be triggered again when the error level $\phi_K$ (or $\phi_{-K}$) is traversed, but production of a thrust for a corrective momentum will be deferred until level $\phi_{K+1}$ is reached, provided a thrust was not triggered previously on $\phi_{K+1}$ or $\phi_{-(K+1)}$.

Figure 7:
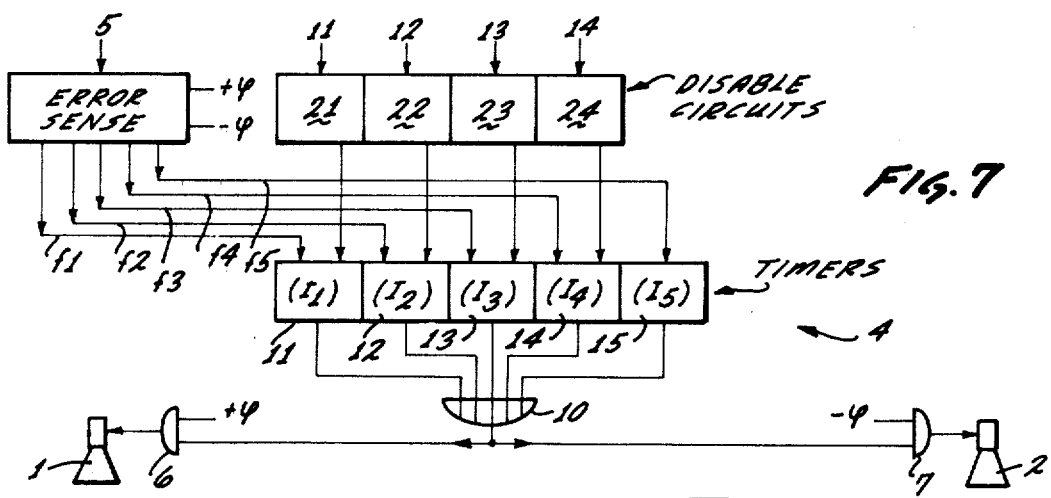
FIG. 7 shows schematically certain implementing features.
Figure 6:
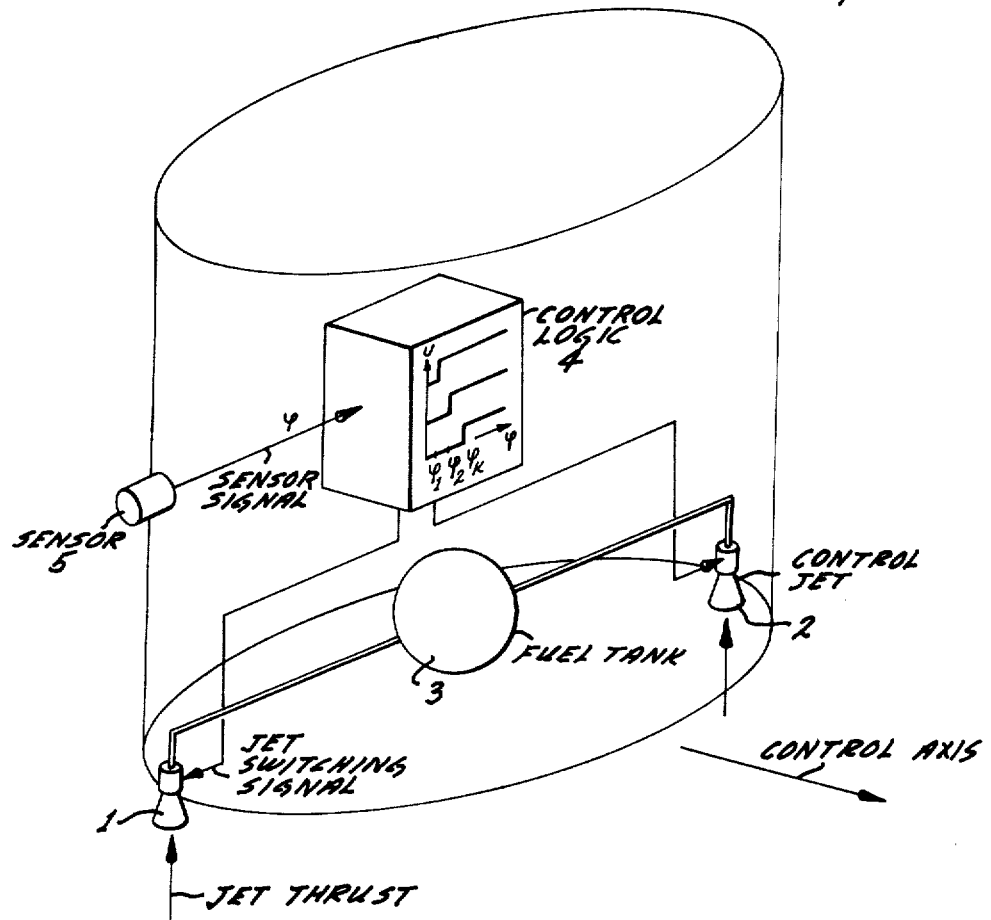
FIG. 6 shows schematically equipment for realizing the invention.

Therefore, the thrusters are controlled in accordance with the present invention analogously as prior art thrusters are controlled for that purpose as far as basic implementation is concerned. Different is the proportioning of the thrust bursts (duration) on the particular levels when the thrusters are to be triggered. FIG. 7 shows symbolically that thrusts of magnitude $I_1, I_2$ to $I_5$ are determined by timed durations from timing devices 11, 12, 13, 14, and 15. $I_{-K}$ and $I_K$ have the same magnitude and $I_{-k}$ is distinguished from $I_{+K}$ in that either thruster 1 or thruster 2 is turned on, dependent upon the sign of the error level, symbolically denoted as $+\phi$ and $-\phi$. The or circuit 10 merely represents symbolically that each timer can operate the thrusters, and the AND circuits 6 and 7 represent the selection of the respective thruster, 1 or 2, in response to the sign of the error level that triggered any of the timers 11 through 15. The magnitude of the resulting incremental angular momentum in each instance is to decrease with the error level that causes the triggering of any other timing devices. Triggering as such occurs in response to conventional attitude sensing on basis of the error levels $\phi_1, \phi_2 ... \phi_5$ and defined as trigger thresholds. Hence, the error sensor circuit 10 produces trigger signals whenever the attitude error traverses one of the levels and the trigger signals are symbolically denoted as $f_1, f_2, f_3, f_4$, and $f_5$, with $f_1$ being produced on the lowest level $\phi_1$ or $\phi_{-1}, f_2$ on the next higher level or $\phi_{-2}$ etc. and $f_5$ being produced on the highest or limit level of this example $\phi_5$ or $\phi_{-5}$. Unlike the prior art, however, the triggering on a level is not "forgotten," but signal representation of that fact is stored, and that level is no longer available. The circuit 21 through 24 disable the timers 11 through 14 respectively, one by one, once they have responded; for example, these circuits 21 to 24 are simple flip-flops, whose output normally is in a state enabling timers 11 to 14 respectively. When a timer has responded, that response is used as a turn off signal for the respective flip-flop (21 to 24) as indicated by the arrows on top, disabling in turn the timer, so that it cannot respond. For example, timer 11 providing the longest period of thruster turn-on was triggered first for producing $I_1$ (or $I_{-1}$) on the lowest error level $\phi_1$ (or $\phi_{-1}$). Having produced its timing pulse, the timer 11 is disabled by circuit 21 so that triggering of either thruster is blocked for that level when sensed again, and only the next higher one (and all higher levels) are then still available for thruster triggering, independently from sign. Thus, as the error signal either goes again to amplitude level $f$, but with opposite sign, that level is not available because timer 11 is disabled. Thus, the error will progress to $f_2$ regardless of whether the original error continued or whether there was a reversal. (The example of FIG. 3 assumes a continuation in that the corrective thrust of largest magnitude $I_1$ is assumed not to correct the error completely or bring about a reversal). As signal level $f_2$ is produced, timer 12 is triggered to control production of the thrust $I_2$ at the appropriate direction. Also, timer 12 is disabled by having turned off flip flop 22. One can readily see the progression here. This rule concerning blocking of trigger levels is not observed on the highest level $\phi_n/\phi_{-n}$, which remain always un-blocked. Accordingly, timer 15 is never blocked, but is always triggered on sensing the largest permissible attitude error, $\phi_5$ or $\phi_{-5}$. This sequential blocking of all levels except the highest is maintained until an intentional rotation of the vehicle is needed and only for homing-in of the vehicle into the new attitude, all levels are made available again simply by turning all flip flops 21 to 24 on again.

The vehicle has a particular range of tolerance within which deviations of actual attitude from desired attitude are permissible. The limits of that tolerance range are determined by the outer levels $\phi_n/\phi_{-n}$ the incremental momentum produced on a level of angular attitude deviation $\phi_k$ decreases within the tolerance level with increasing level. Consequently, the largest corrective angular momentum is produced when the vehicle is off its correct attitude by the relative small angle $\phi_1$ or $\phi_{-1}$.

The magnitude of each incremental angular momentum is determined as per the equation (2) to be effective on traversal of level $\phi_K$, and is restated presently:

$$(2)\ I_k = C \sum_{i=K+1}^{n} I_i\ ;\ 0 < C < 1$$

whereby $C$ is actually chosen to have the right-hand side somewhat larger than the left-hand side in each instance.

To put the equation into words, a relatively small angular momentum is produced when the vehicle is about to rotate so as to escape an angular limit of tolerance as to attitude deviation, given by angle pair $\phi_n/\phi_{-n}$. Each momentum is the sum total of all momenta acting in the same direction and being produced on traversal of all higher error angle levels. This rule is relevant as such only for proportioning the corrective incremental angular momenta. The rule has no relevancy as to timing and actual triggering of the thruster on traversal of the error levels.

In addition, the rule is repeated that each incremental, corrective, angular momentum is produced only once, beginning with the production of the respectively associated momentum $I_1$ as soon as the vehicle rotates away from the desired attitude and exceeds angle $\phi_1$ or $\phi_{-1}$. Once that occurs, level 1 is, so to speak, used up, and only the other levels are available for triggering a correction producing thrust. The next level used will be $\phi_2$ or $\phi_{-2}$, and equation (2) determines the magnitude of the thrust then produced.

Figure 3:
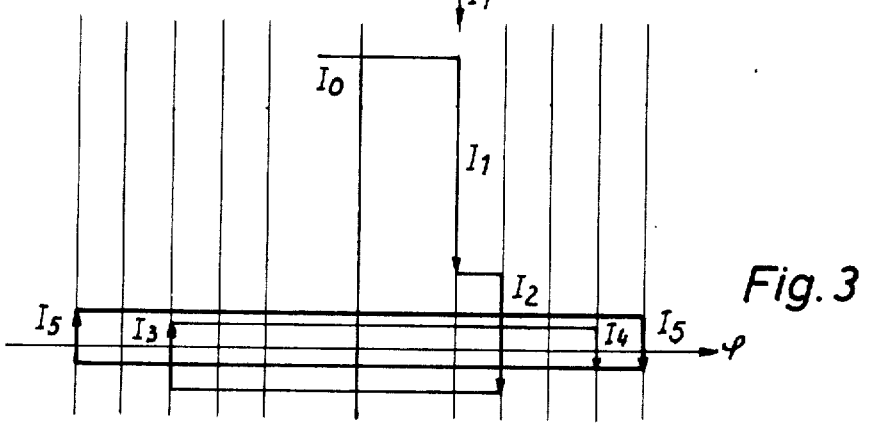
FIG. 3 illustrates a sequence of control operations under the principle in accordance with the invention.

As a consequence, the control system is convergent within the angle range $\phi_n/\phi_{-n}$ in that the above defined residual error rotation is carried out between angles $\phi_n$ and $\phi_{-n}$, with reversal in each instance as the attitude angle tends to increase beyond either limit. Any initial angular velocity corresponding to an angular momentum $I_o$ is reduced to a velocity corresponding to an angular momentum between $I_n$ and half that value. This situation is shown in FIG. 3.

FIG. 3 shows again an initial angular momentum $I_o$ which causes the vehicle to deviate from its desired attitude ($\phi = 0$). Each of the control thrusts provides a particular incremental, angular momentum, whereby as a consequence of the proportioning of these momenta, five thrust bursts suffice until the stabilizing, residual error cycle is reached wherein the attitude is permitted to change between $\phi_5/\phi_{-5}$, with a velocity of oscillation having indeed value between the velocity corresponding to a momentum between $I_5$ and $I_5/2$.

The indices for the incremental momenta as plotted show also the sequence of invocation. At first, the relatively large counter momentum $I_1$ is produced as the vehicle, having momentum $I_o$ tends to deflect by more than $\phi_1$ from the desired attitude. As $I_o > I_1$, the rotation continues in the same direction, but is drastically slowed down. As $\phi_2$ is reached, a somewhat smaller counteracting incremental angular momentum $I_2$ is produced, slowing the vehicle to a stop but causing, in this example overshooting and the vehicle, rather slowly, reverses. Thus, the attitude error is reduced to zero but an oppositely directed error builds up.

In accordance with the rule given above, levels $-1$ and $-2$ are already used up (using them once eliminates the levels in both directions from establishing further trigger levels). Thus, a corrective angular momentum $I_3$ is produced only after the vehicle has been deflected to angle $\phi_{-3}$. That reverses the rotation again, and it can be seen that on $\phi_4$, $I_4$ is produced, and as soon as upon slow reversal the vehicle has reached maximum angle $\phi_{-5}$, the system enters the residual error cycle mode in which it continues.

It can, thus, be seen that an incremental momentum $I_k$ or $I_{-k}$ is produced only once until the stabilizing cycle is reached. This holds true, of course, for all levels except the highest one, but one can say that upon calling for $I_n$ or $I_{-n}$ for the first time, the residual error and stabilizing mode has been reached. All trigger levels remain blocked, except $\phi_5$ and $\phi_{-5}$, until the vehicle is intentionally turned into a new attitude, whereupon homing-in on that new attitude commences anew with all descrete trigger levels $\phi_1$, ... being initially available again.

Comparing FIG. 1 with FIG. 3 demonstrates clearly the advantages of the control mode used in the latter. Inverse staggering rather than direct staggering of allocating corrective incremental momenta to error angle levels causes a drastic reduction in the production of strong thrusts, and limits overshooting accordingly. FIG. 3 shows that the stabilizing and residual error cycle is reached after five thrust pulses, whereas fifteen pulses were required for reaching that state as per FIG. 1. Specifically, the stabilizing cycle in the known method is carried out between $\phi_{-1}$ and $\phi_1$, while the new method uses a stabilizing cycle between larger levels, e.g. $\phi_{-5}$ and $\phi_5$ so that (for similar thrusts, $I_1$ — FIG. 1 and $I_5$ — FIG. 3) the oscillation period is longer. A lower frequency for the stabilizing cycle, however, means a correspondingly less frequent thruster operation. Frequency of thruster operation and, therefore, their life and total consumption of propellant is reduced accordingly.

The foregoing assumed a satisfactory and tolerable low reversing momentum $I_5$ for the residual error cycle, and equation (2) then provides the rule for the other momenta. That, however, does not per se establish conditions for correcting all occurring momenta that may tend to deflect the vehicle out of the desired attitude. Thus, for the control system to operate satisfactorily, it is necessary that a vehicle having maximum (angular) velocity reverses direction not later than when reaching a tolerance limit ($\phi_n$ or $\phi_{-n}$). Consequently, the sum of all incremental momenta produced in one direction upon deviation of the orientation of the vehicles from its desired attitude should at least be equal to or larger than the angular momentum corresponding to an initial maximum angular velocity of the vehicle.

The following equation (3) sets forth the relationship between the several incremental angular momenta as produced by control thrust bursts, and the maximum attitude error producing angular momentum of the vehicle $\dot{\phi}_{o\,max} \cdot \theta$ is the moment of inertia of the vehicle in relation to the axis about which the incremental angular momenta are produced.

$$(3)\quad \sum_{K=1}^{n} I_K = \frac{\theta}{C} \dot{\phi}\,omax\,\theta < C < 1$$

The equation (3) is true as such for chosen values of $C$ with $0 < C < 1$, and the sum on the left-hand side can be made larger by choosing a smaller $C$ than present for satisfying the equation. A smaller $C$ then meets the desired condition stated in the preceding paragraph.

As the maximum angular velocity $\dot{\phi}_{o\,max}$ is known, equations (2) and (3) can be used to determine the magnitude of each incremental angular momentum.

$$(4)\quad I_K = \frac{\theta\,\dot{\phi}\,o\,max}{(1+C)\cdot K} \quad (K = 1,2 \cdots n-1)$$

$$I_n = \frac{\theta\,\dot{\phi}\,o\,max}{C\,(1+C)^{n-1}}$$

Aside from suppressing undesired high angular velocities of the vehicle generally and maintaining its attitude within prescribed limits, it is also necessary that the angular velocity itself converges toward the value that is determined by the limit momentum $I_n$. That condition is, in fact, fulfilled by chosing the incremental momenta as given by equation (2). If the vehicle is caused to return after having reached a particular angle of attitude deflection, the velocity or return cannot possibly be larger than the relative velocity which that incremental momentum imparts per se upon the vehicle. This is necessarily so as at least a part of that momentum was, in fact, needed to effect the return to begin with. The sum total of all incremental momenta that will be produced thereafter, is larger as per equation (2) than the incremental momentum that slowed the vehicle completely to a stop and reversed the rotation of the vehicle at that point. Thus, the vehicle will be stopped again thereafter with certainty by operation of the control thrusts produced as per rules above. As these rules apply to each level, including the momentum $I_n/I_{-n}$, the (absolute) angular velocity after the first limit momentum ($I_n$ or $I_{-n}$) will not be larger than the relative angular velocity produced on basis of that limit momentum itself.

The implementation factor $C$, which occurs in all equations, is preferably not much smaller than unity (e.g. 0.8). Such a factor, close to but definitely below unity, is beneficial for obtaining velocity convergence as fast as possible. However, the value $C$ should not be too close to unity as reproduction errors in the thrusters may then lead to rotational instability. A value of 0.8 for $C$ was found satisfactory in these respects.

In accordance with a further feature of the invention, the several angular momenta are to be grouped and in each group the same magnitude of momentum prevails. The equation (2) is thus applied only to the magnitude as used in each group of levels. This feature is illustrated in FIG. 4. Three angular levels are allocated to each group. The velocity converging occurs in the same manner as in FIG. 3 in principle. However, the additional requirement of grouping coupled with the still further requirement of reversal of rotation or each group permits particularly advantageous operation.

If one follows the sequence of thrust production, one can see from FIG. 5 that a reversal occurs in each group, i.e., the operation is such that once angular momentum is produced within any group of angle ranges, reversal of rotation will occur, possibly after several bursts but within one and the same group. The thrusts are to be proportioned so that the angular momentum within a group is related to that of the next lower level group by $$I_K = I_{K-1} \cdot 1/C\,m \qquad (5)$$

whereby $m$ is the number of levels per group (e.g. 3 in FIG. 4), and $C$ is a parameter having constant value between 0 and 1. Again, only one incremental angular momentum per level is triggered (except on the limit).

The invention is not limited to the embodiments described above but all changes and modifications thereof not constituting departures from the spirit and scope of the invention are intended to be included.

I claim:

1. Method of providing control for a space vehicle having thrust-producing means producing thrust for imparting momentum upon the vehicle thereby imparting motion upon the vehicle or reducing existing motion or reversing movement, further having control means for the thrust producing means causing the thrust producing means to produce thrust bursts or pulses, so that a controlled particular momentum is imparted upon the vehicle with each burst or pulse, such thrust burst being triggered by the control means respectively when the vehicle tends to move beyond selected descrete deviations and error positions from a desired position, said descrete deviations establishing descrete position levels which in turn establish respectively levels for control and triggering of a thrust burst, one of the position levels being the highest one, comprising:

selecting the descrete position levels as levels for control triggering so that the highest one of said position levels, one in either direction as to deviation from the said desired position, are limit levels, defining a range of positional deviation tolerance; operating the thrust producing means so that a relatively small momentum is produced when the vehicle tends to move past either of said limit levels; operating the thrust producing means on particular levels of error positions within said range for producing momentum on each one of said levels (1) at a magnitude that is smaller than the sum of momenta to be produced on all position levels higher than said one level;

(2) only after momenta have been produced for all selected smaller position levels;

(3) only once for each sequence of thrust bursts leading to a residual error cycle wherein the vehicle is caused to oscillate within the range of tolerance with reversal occuring on each range limit and caused by said small momentum triggered in each instance when one of the range limits is reached.

2. The method as in claim 1, wherein the levels are grouped, a group including plural sequentially effective levels, the momenta produced on levels of the same group being equal.

3. The method as in claim 1, wherein the magnitude of the momentum allocated to each level in any group pursuant to the second operating step, substep (2) is selected so that the sum of the momenta thereof will produce reversal of movement of the vehicle.

4. The method as in claim 1, wherein the thrust producing means produce angular momenta, and wherein the desired and actual positions are attitude angles on a particular axis, said levels being error angles as between actual and desired attitude of the vehicle in relation to and about said particular axis.

5. The method as in claim 4, wherein the said small momentum is an angular momentum being dimensioned to be equal to $\theta \cdot \phi_{o\,max} / C (I + C)^{n-1}$, wherein $\theta$ is the moment of inertia of the vehicle on said axis, $C$ is a constant smaller than 1, $n$ is the number of said levels as to one direction, $\phi_{o\,max}$ is the maximum angular velocity of the vehicle that produces attitude errors; the angular momentum to the K'th level, with $K$ being an integer from 1 to $n + 1$ being $\theta \cdot \phi_{o\,max} (1 + C) \cdot K$.

* * * * *